(12) United States Patent
Zats et al.

(10) Patent No.: US 7,909,159 B1
(45) Date of Patent: Mar. 22, 2011

(54) ADJUSTABLE MULTI-LANE CONVEYOR

(75) Inventors: Alexander Zats, Upper Arlington, OH (US); Matthew Setterington, Hawkestone, CA (US); Stephen Loftus, Barrie, CA (US)

(73) Assignee: Honda Motor Co., Ltd., Tokyo (JP)

( * ) Notice: Subject to any disclaimer, the term of this patent is extended or adjusted under 35 U.S.C. 154(b) by 61 days.

(21) Appl. No.: 12/538,765

(22) Filed: Aug. 10, 2009

(51) Int. Cl.
*B65G 15/10* (2006.01)

(52) U.S. Cl. ........ 198/586; 198/817; 198/606; 198/604; 198/620

(58) Field of Classification Search .......... 198/586, 198/604, 606, 620, 817
See application file for complete search history.

(56) References Cited

U.S. PATENT DOCUMENTS

| | | | |
|---|---|---|---|
| 2,981,399 A | | 4/1961 | Parker |
| 3,290,041 A | * | 12/1966 | Cunningham ............... 198/606 |
| 4,043,442 A | * | 8/1977 | Greenwell et al. ......... 198/418.1 |
| 4,709,799 A | * | 12/1987 | Ljungberg ................... 198/412 |
| 5,067,608 A | | 11/1991 | McLellan |
| 5,186,978 A | * | 2/1993 | Woodhall et al. ............ 427/154 |
| 5,368,643 A | * | 11/1994 | Kuster .......................... 118/324 |
| 5,421,446 A | | 6/1995 | Koch et al. |
| 5,823,316 A | | 10/1998 | Shaw et al. |
| 6,012,568 A | | 1/2000 | Kane |
| 6,471,044 B1 | * | 10/2002 | Isaacs et al. .................. 198/809 |
| 6,688,458 B2 | | 2/2004 | Prentice et al. |
| 6,776,279 B2 | * | 8/2004 | Krull et al. ................. 198/626.5 |
| 6,945,530 B2 | * | 9/2005 | Cinotti et al. ................. 271/240 |
| 7,036,656 B2 | | 5/2006 | Gariglio |
| 7,156,222 B2 | * | 1/2007 | Schnuelle et al. ......... 198/626.3 |
| 7,232,029 B1 | * | 6/2007 | Benedict et al. ............. 198/817 |
| 7,497,096 B2 | | 3/2009 | Asai et al. |
| 7,588,239 B2 | * | 9/2009 | Marcinik et al. .......... 270/52.18 |
| 2003/0159906 A1 | * | 8/2003 | Rinks et al. .................... 198/586 |
| 2005/0269184 A1 | * | 12/2005 | Enya .......................... 198/369.2 |
| 2008/0011583 A1 | | 1/2008 | Beck et al. |

\* cited by examiner

*Primary Examiner* — Mark A Deuble
(74) *Attorney, Agent, or Firm* — Standley Law Group LLP

(57) ABSTRACT

A conveyor including a plurality of individual conveyor units associated with a common conveyor frame and adapted for independent lateral and vertical position adjustment. The conveyor units form independent conveyors capable of conveying an object. The position of each conveying unit is adjustable along the conveyor frame in a direction substantially transverse to the conveying direction. The height of each conveying unit is also independently adjustable. Consequently, the conveying units may be arranged to form overall conveying surfaces of different configuration. The conveyor may also include a frame lift assembly capable of simultaneously and uniformly raising or lowering one end of all the conveyor units present.

20 Claims, 7 Drawing Sheets

ADJUSTABLE MULTI-LANE CONVEYOR

TECHNICAL FIELD

The present invention is directed to a conveyor having multiple conveyor units. More particularly, the present invention is directed to a conveyor having multiple conveyor units that may be selectively repositioned in at least two directions to accommodate objects of different size and/or shape.

BACKGROUND

In manufacturing environments, such as those that employ a stamping operation, it is often required to convey large and/or irregularly-shaped objects from one manufacturing location to another. For example, it may be required to convey a vehicle body panel from a stamping location to an inspection area or to another downstream location, such as a welding department.

The conveyance of large and/or irregularly-shaped objects is not limited to a manufacturing environment. Rather, the conveyance of such objects may take place in multiple industries. In any event, conveying objects of different sizes along a single conveyor line and/or conveying objects of irregular shape may be problematic for several reasons. In the former case, a substantial difference in the size of objects to be conveyed may require the construction and use of a conveyor that is substantially larger than necessary to convey many of the objects transported thereby. In the latter case, objects with substantially irregular shapes (e.g., vehicle body panels) may not ride properly on a typical flat conveyor belt and/or may sustain damage to one or more portions thereof when transported by such a conveyor belt.

It can be understood from the foregoing commentary that it would be desirable to provide a conveyor apparatus that is adaptable to a particular object that is to be transported thereby. A conveyor of the present invention provides such adaptability.

SUMMARY OF THE GENERAL INVENTIVE CONCEPT

The present invention is directed to a conveyor having multiple individual conveying units, the position of which may be preferably adjusted to accommodate a particular object to be conveyed. In certain embodiments, the position of each conveying unit may be adjustable. In other embodiments, the position of only certain ones of the conveying units may be adjustable. Preferably, the position of the conveying units may be adjusted in two directions. More preferably, the lateral position and the height of the conveying units may be adjusted to accommodate objects of different size and/or shape.

A conveyor of the present invention includes a frame for supporting a desired number of individual conveying units. The individual conveying units form independent conveying lanes, each with its own conveying surface (e.g., conveyor belt). In turn, the individual conveying lanes collectively provide a larger overall conveying surface. In order to accommodate one or more objects to be conveyed, the number of individual conveying units and/or the size thereof may vary.

Each conveying unit is preferably a substantially independent conveyor assembly. As such, each conveying unit may include rollers or similar elements around which a conveying element, such as a conveyor belt, passes. Each conveying unit also includes a drive mechanism for causing movement of the conveying element. Preferably, each conveying unit is also adapted to allow for repositioning thereof in a direction substantially transverse to the conveying direction, as well as for an adjustment of conveying unit height with respect to the ground or a similar frame of reference.

By utilizing a number of such individual conveyor units, a conveyor having a variable overall width and contour may be provided. For example, when conveying objects of different size, the individual conveyor units may be laterally disposed to produce an overall conveying surface of greater or lesser width. Similarly, when conveying an object of irregular shape, the individual conveyor units may be laterally disposed and/or the heights of the individual conveyor units may be adjusted to produce a contoured conveying surface adapted to properly support the object.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1a is a perspective view of one exemplary embodiment of a conveyor of the present invention;

FIG. 1b is an enlarged transparent view of one end of a conveying unit of the conveyor of FIG. 1a;

DETAILED DESCRIPTION OF EXEMPLARY EMBODIMENT(S)

Figures 1A, 1B:
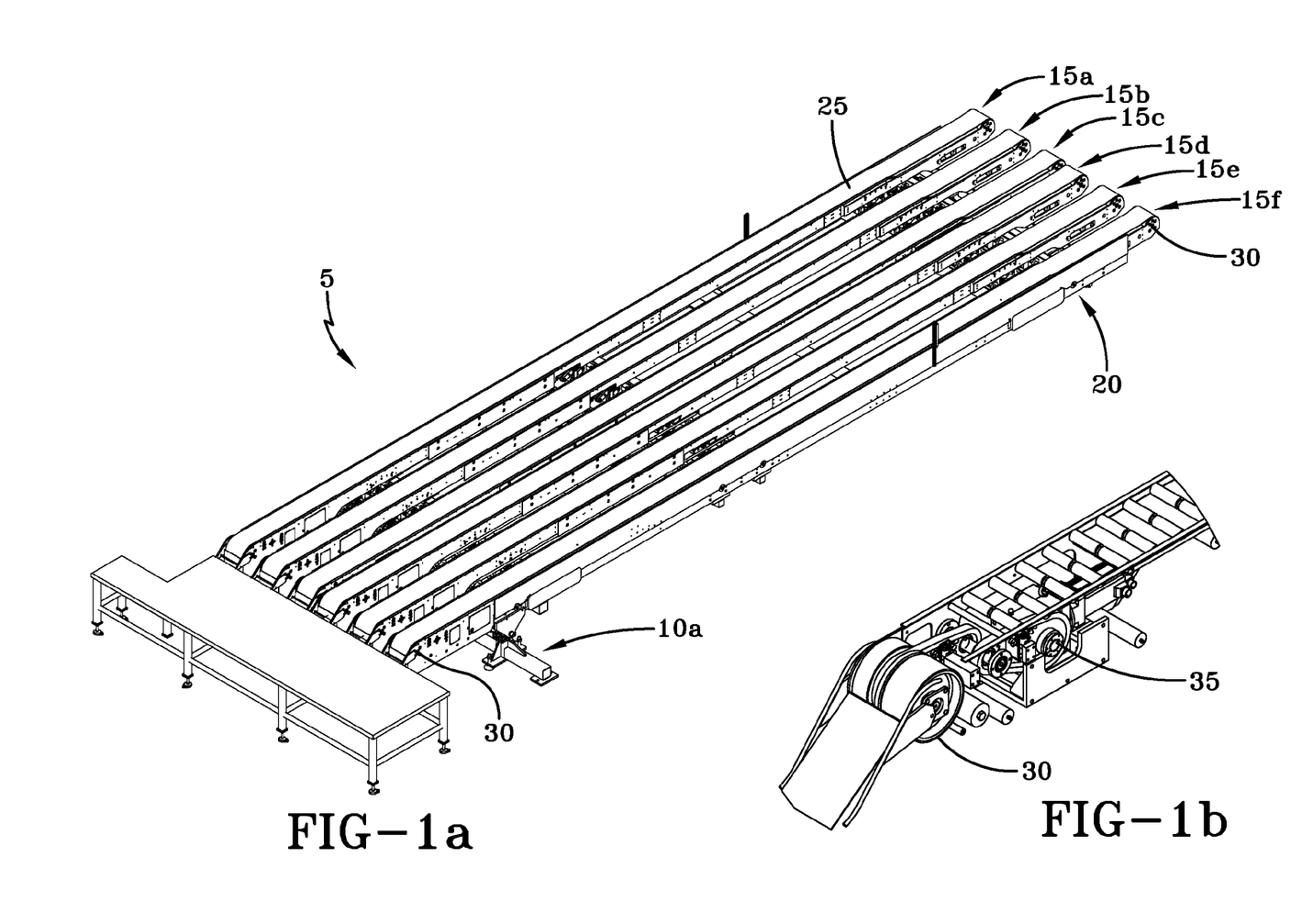

One exemplary embodiment of a conveyor assembly (conveyor) 5 of the present invention is depicted in FIGS. 1a-1b. As shown, the conveyor 5 includes a primary frame 10a that supports a number of independent and elongate conveying units 15a-15f (which may also be collectively referred to by reference number 15) on a sub-frame 10b. The conveying units 15 are arranged so as to form individual conveying lanes. In this particular example, there are six conveying lanes, but other numbers of conveying lanes may be present in alternate embodiments of the present invention.

Each conveying unit 15a-15f includes its own frame 20 and an independently driven conveyor element 25 which, in this case is a belt, for conveying an object of interest. In other embodiments, the conveyor element may comprise a linked conveying element or any other conveying element known in the art. The conveyor belt 25 of this embodiment is associated with one or more rollers 30 that are supported by the frame 20 and are used to drive and guide the conveyor belt. As shown in the enlarged transparent view of FIG. 1a, this embodiment of the conveyor 5 includes a drive motor 35 that resides within the conveying unit frame 20 and is associated with one of the rollers 30 to produce a conveying movement of the conveyor belt 25. Consequently, each conveying unit 15a-15f is actually a self-contained conveyor capable of conveying an object of interest (within some range of size and weight).

As can be seen in FIG. 1, and as can be more clearly observed in FIGS. 2 and 6-9, the frames 20 of each conveying unit 15a-15f are coupled to the sub-frame 10b of the overall conveyor assembly 5 in a manner that permits the lateral and vertical adjustment of each conveying unit. That is, each conveying unit 15a-15f may be moved in a direction substantially transverse to the conveying direction, and each conveying unit may be moved in a vertical direction such that the height thereof with respect to the ground or a similar frame of reference may be adjusted.

Figure 2A:
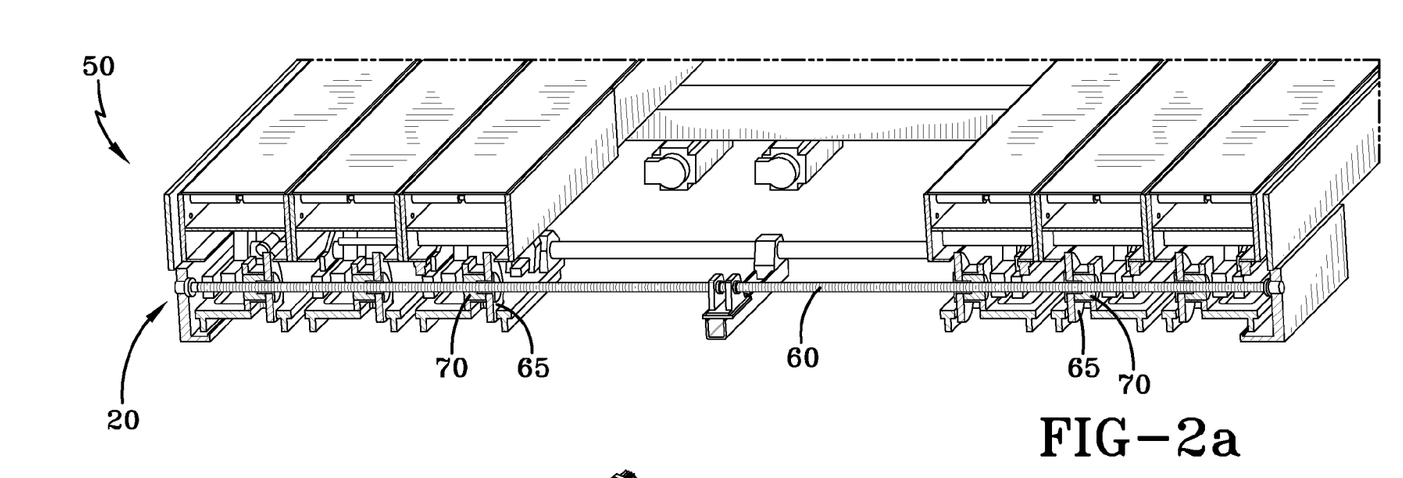
FIG. 2a is an enlarged cutaway view of the conveying units of FIG. 1a, wherein a lateral positioning assembly that produces lateral adjustment of the individual conveyor units can be observed.
Figure 2B:
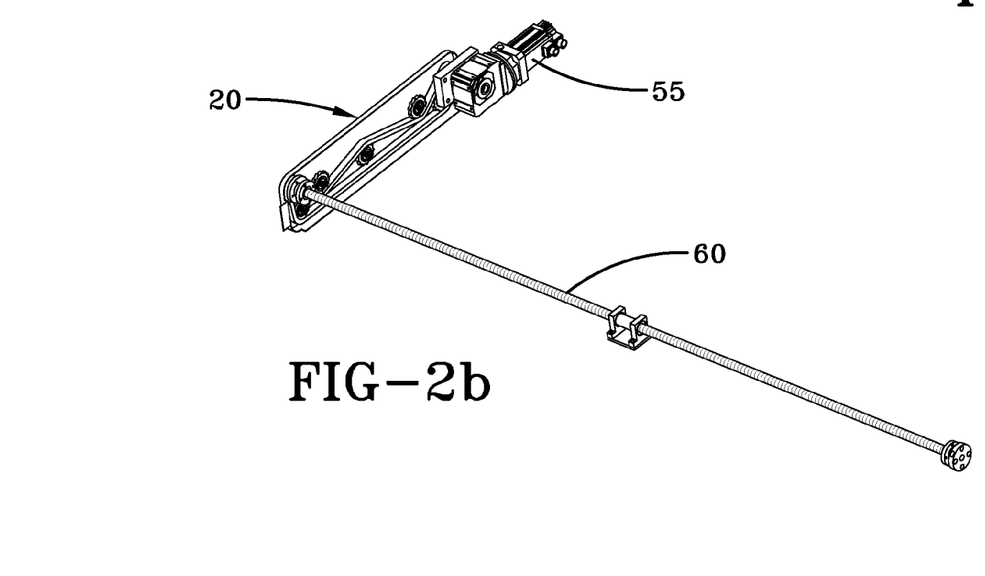
FIG. 2b is a perspective view of a portion of the lateral positioning assembly of FIG. 2a, wherein surrounding structure has been removed for clarity.

Lateral adjustment of the individual conveying units 15a-15f of this particular conveyor embodiment can be best understood by reference to FIGS. 2a-2b. As shown, the conveying units 15a-15f are slidably associated with the sub-frame 10b. While not shown in detail herein, one skilled in the art would realize that such a slidable relationship may be achieved in a number of ways, including through the use of various linear guide components.

Each conveying unit 15a-15f is releasably coupled to a lateral positioning assembly 50. As can be best observed in FIG. 2b, the lateral positioning assembly of this embodiment comprises a servo motor 55 coupled to a threaded drive shaft 60 that passes through each conveying unit 15a-15f as it traverses the width of the conveyor 5. Referring back to FIG. 2a, it can be seen that a combination clutch/brake device 65 is located within each conveyor unit 15a-15f to selectively couple and decouple the drive shaft 60 to a like threaded coupler 70 within a given conveyor unit. Activation and deactivation of the clutch/brake device 65 may be accomplished by the sending of an electrical signal, as would be understood by one of skill in the art.

Operation of the servo motor 55 causes rotation of the drive shaft 60, which results in lateral movement of any conveying unit 15a-15f coupled thereto by its clutch/brake device 65. Generally, only one conveying unit at a time is coupled to the drive shaft 60, such that the conveying units may be independently laterally positioned. The direction in which a conveying unit 15a-15f is laterally displaced is controlled by the direction of rotation of the servo motor 55 and associated drive shaft 60.

Only one lateral positioning assembly 50 is shown in FIGS. 2a-2b. However, it should be understood that this particular conveyor 5 actually has two such assemblies—one near each of the entry and exit ends of the conveyor. The lateral positioning assemblies 50 operate in a synchronous manner to ensure that the conveying unit 15a-15f moves uniformly during a lateral positioning operation. In other embodiments, it may be possible to accomplish such synchronous movement by employing a single servo motor that is coupled to drive shafts at each conveyor end by a common linkage.

Figure 3:
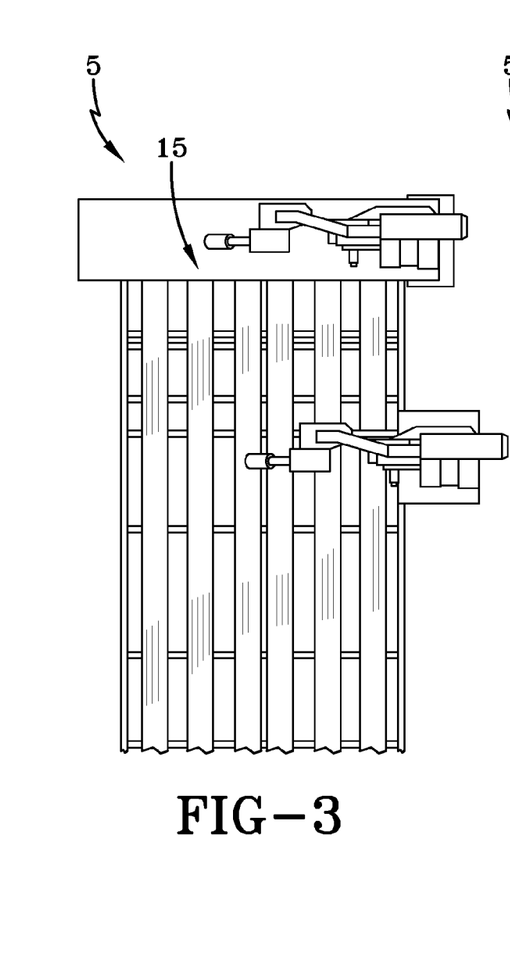
FIG. 3 shows the conveyor of FIG. 1 with the individual conveyor lanes thereof in a first lateral position.
Figure 4:
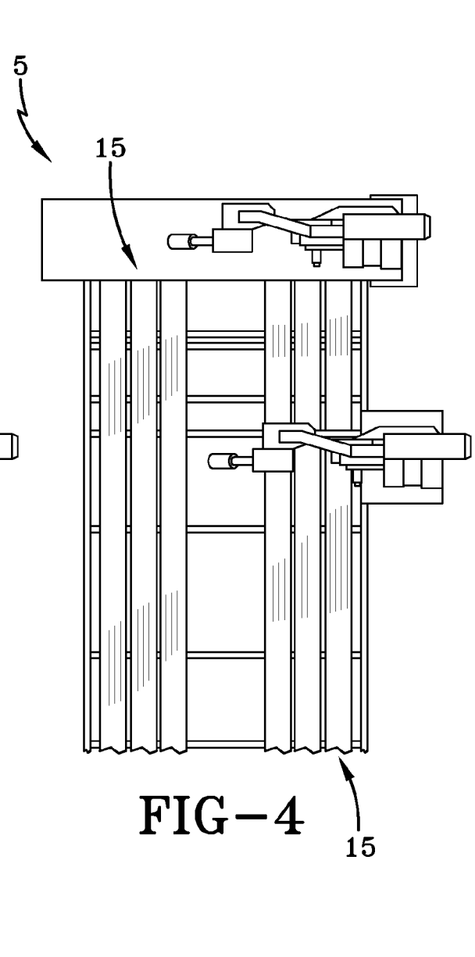
FIG. 4 shows the conveyor of FIG. 1 with the individual conveyor lanes thereof in a second lateral position.
Figure 5:
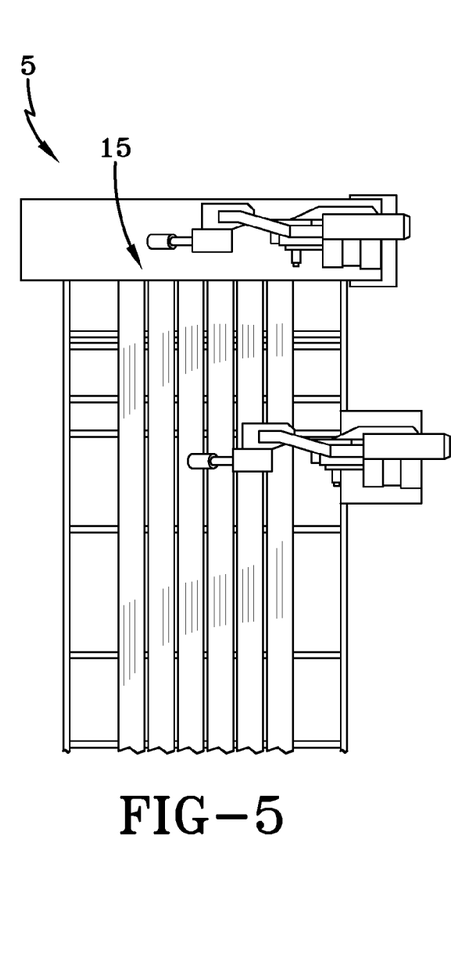
FIG. 5 shows the conveyor of FIG. 1 with the individual conveyor lanes thereof in a third lateral position.

The lateral positioning capability of the conveyor 5 is illustrated by the exemplary conveyor unit arrangements shown in FIGS. 3-5. The conveyor unit arrangement of FIG. 3 provides for a substantially large overall conveying surface due to the generally spaced apart positioning of the individual conveying units 15a-15f. The substantially equal spacing between most of the conveying units 15a-15f ensures that the support provided to an object being conveyed is well distributed.

The conveyor unit arrangement of FIG. 4 provides for a conveying surface having an open channel substantially along the centerline of the conveyor 5. This configuration is achieved by moving an equal number of conveying units 15a-15f toward opposite sides of the conveyor frame 10. As would be apparent, a comparable configuration could be produced by similarly arranging an unequal number of the conveying units 15a-15f, in which case the location of the open channel will be shifted away from the conveyor centerline. In any case, such a configuration may be desirable when conveying objects having an irregular shape with a generally centrally located downwardly extending portion, as the objects may be transported in a substantially flat orientation by allowing the downwardly extending portion to travel within the open channel.

The conveyor unit arrangement of FIG. 5 provides for a conveying surface having an area of central support with an open channel along the lateral edges of the conveyor 5. This configuration is achieved by moving all of the conveying units 15a-15f toward the centerline of the conveyor frame 10. Such a configuration may be desirable when conveying objects having an irregular shape with downwardly extending portions located generally near opposite ends thereof. Particularly, this configuration allows such objects to be transported in a substantially flat orientation by centrally supporting the objects but allowing the downwardly extending portions to overhang the conveying units and travel within the open lateral channels.

Figure 6:
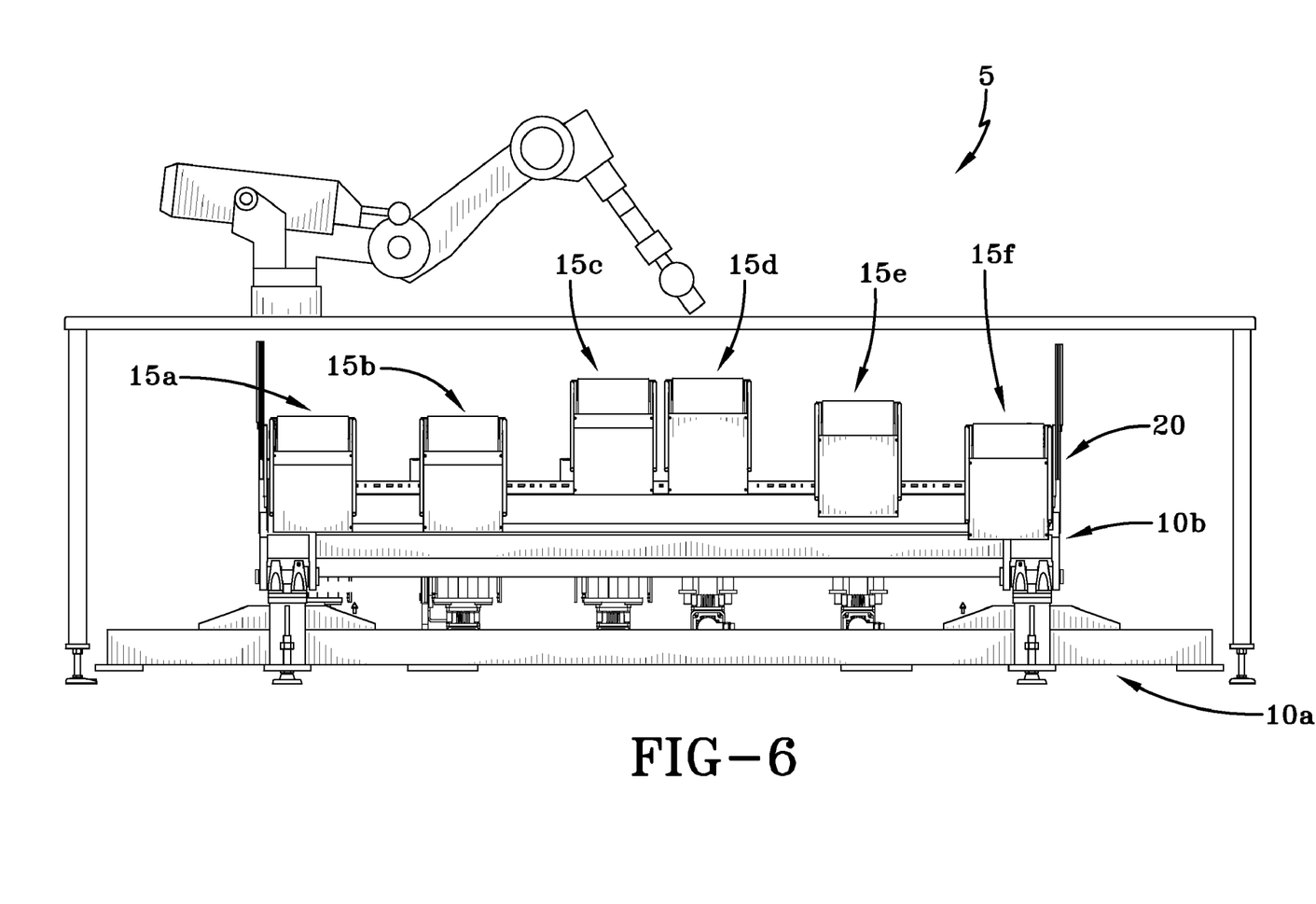
FIG. 6 shows the conveyor of FIG. 1 with the individual conveyor lanes set to different heights to properly support an object of interest during the conveying thereof

As mentioned above, and as depicted in the exemplary arrangement of FIG. 6, the height of each conveying unit 15a-15f may be independently adjusted to accommodate the shape of a given object being conveyed. The conveyor configuration of FIG. 6 is being used in FIG. 7a to convey a curved vehicle roof panel 75. Based on the size and curvature of this exemplary roof panel, three of the conveying units 15c-15e are used to provide for deform free conveying. Specifically, the three conveying units 15c-15e are laterally separated and vertically adjusted as shown so as to convey the roof panel 75 in a stable manner. Moreover, as can be understood by reference to FIG. 7b, this conveyor configuration allows the roof panel 75 to be conveyed without the damage often caused by conveyance on a typical flat conveyor.

Figure 7A:
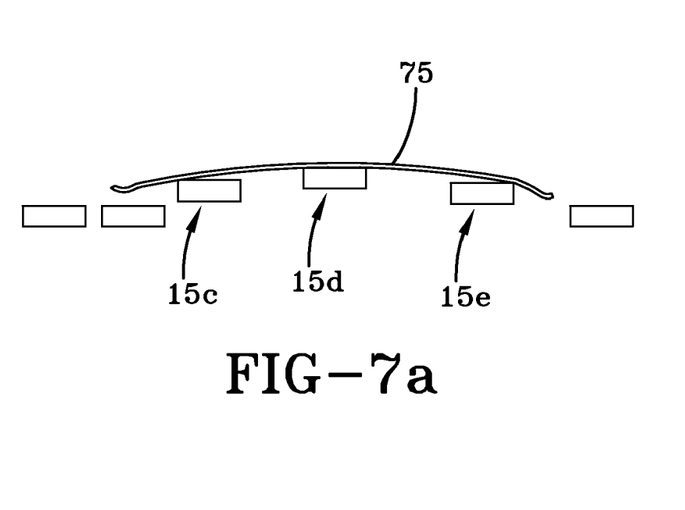
FIG. 7a shows the conveyor configuration of FIG. 6 being used to convey a curved vehicle roof panel.
Figure 7B:
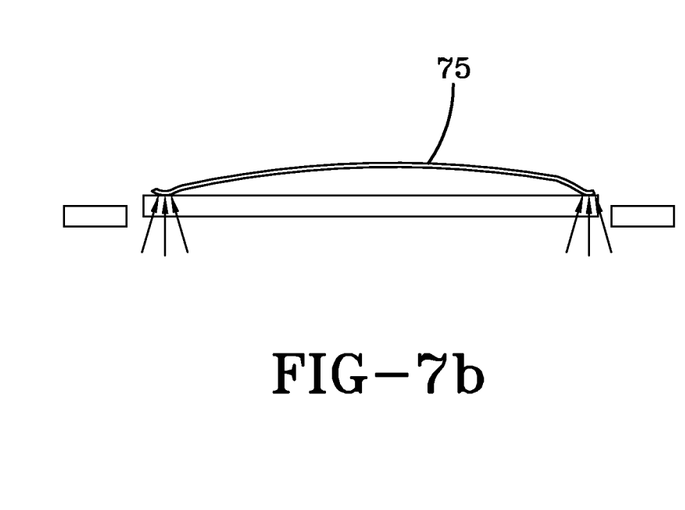
FIG. 7b illustrates how the roof panel of FIG. 7a is commonly damaged during transport on a typical flat conveyor.

While the object being conveyed in FIG. 7a is a curved vehicle roof panel, a conveyor of the present invention may obviously also be configured to properly support many other objects of various other shapes. Further, as FIG. 6a illustrates, a conveyor of the present invention may convey an object using less than all of the conveyor units present. Instead, the number of conveyor units used may depend on the size and/or shape of a given object to be conveyed.

Figure 8A:
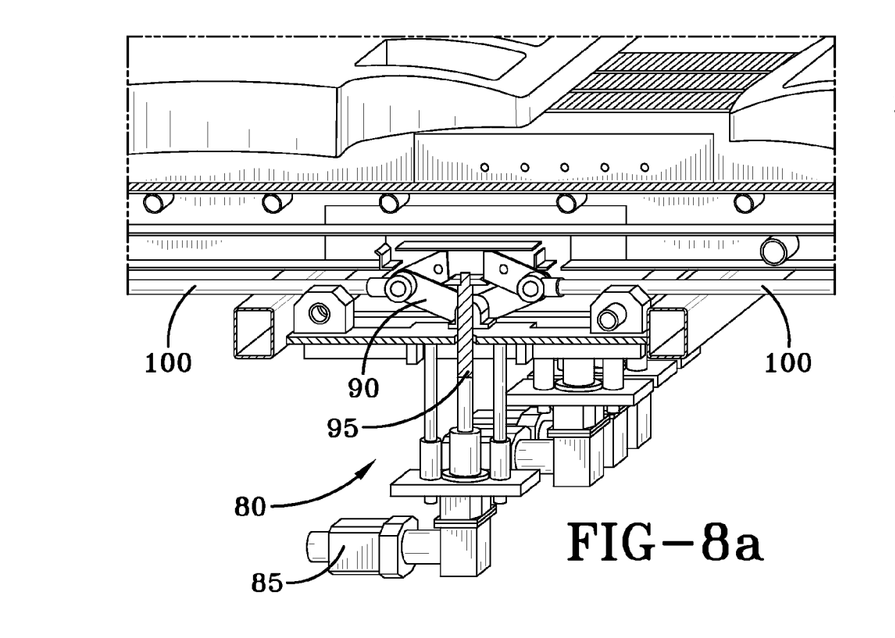
FIGS. 8a-8c illustrate various views and sections of a vertical positioning assembly that produces vertical adjustment of the individual conveyor units of FIG. 1.
Figure 8B:
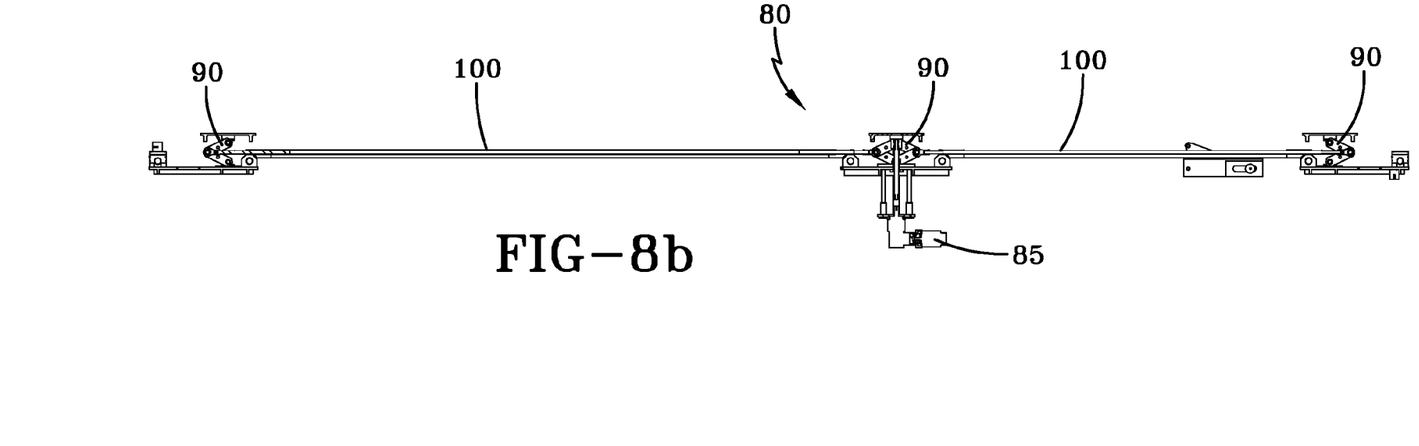
Figure 8C:
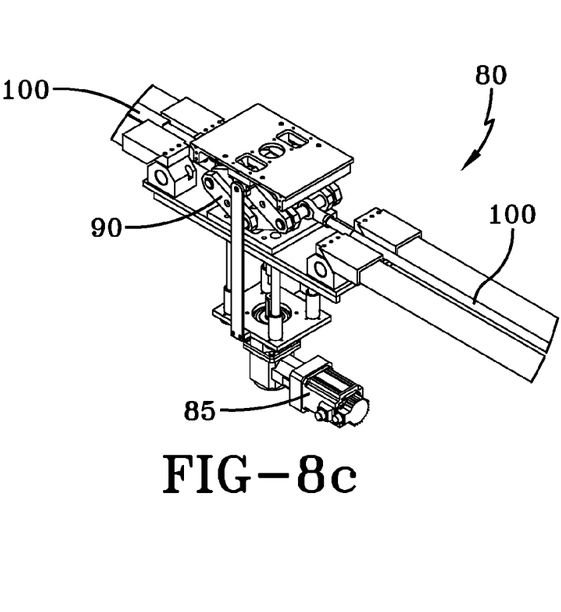

An exemplary mechanism by which such vertical adjustment of the individual conveying units 15a-15f of the conveyor is accomplished can be understood by reference to FIGS. 8a-8c. As shown, the conveying units 15a-15f each include a vertical positioning assembly 80 for this purpose. In this particular embodiment, each vertical positioning assembly includes a servo motor 85 associated with three separate lift mechanisms 90. A lift mechanism 90 is present near each end of each conveying unit 15a-15f, and a central lift mechanism is located near the middle thereof. As is explained in more detail below, this arrangement ensures that a conveying unit will be uniformly raised or lowered when a height adjustment is made.

The servo motor 85 is associated with the central lift mechanism 90, and is coupled thereto by a ball screw 95. Rotation of the ball screw 95 by the servo motor 85 causes the central lift mechanism 90 to extend or retract. Operation of the lift mechanism in this manner would be well understood by one of skill in the art, and a variety of such lift mechanisms are commercially available.

As most clearly shown in FIG. 8b, the lift mechanisms 90 and the servo motor 85 are interconnected by a pair of linkage rods 100. Consequently, when the servo motor 85 causes an extension of the central lift mechanism 90, the lift mechanisms 90 at each end of the associated conveying unit are also equally extended by a resulting inward lateral movement of the linkage rods 100. Contrarily, an opposite rotation of the servo motor 85 will result in a like retraction of all three lift mechanisms 90.

The lift mechanisms 90 of this embodiment are located between the conveyor sub-frame 10b and the frame 20 of each conveying unit 15a-15f. Alternatively, lift mechanisms 90 could be located between the conveyor frame 10b and the frame 20 of each conveying unit 15a-15f, or between the ground and the frame of each conveying unit. Consequently, when the lift mechanisms 90 are extended by the servo motor 85, the height of the associated conveying unit is uniformly raised. When the lift mechanisms 90 are retracted by the servo motor 85, the height of the associated conveying unit is uniformly lowered.

In certain embodiments, a conveying unit may be provided with a single and substantially centrally located vertical positioning assembly, such that activation thereof will result in a height adjustment that is substantially uniform across the length of the conveying unit. In such a case, vertical guide members may be provided to help ensure proper vertical movement of the conveying unit. Alternatively, one or more of the conveying units of the conveyor may be provided with multiple vertical positioning assemblies. For example, the conveying units 15a-15f of the exemplary conveyor shown and described herein, are each equipped with a pair of vertical positioning assemblies located near their opposite ends. In this manner, it is possible to set one end of a given conveyor unit to a height that is dissimilar to the height of the opposite end of the conveyor unit (i.e., to angle the conveying surface).

Figure 9:
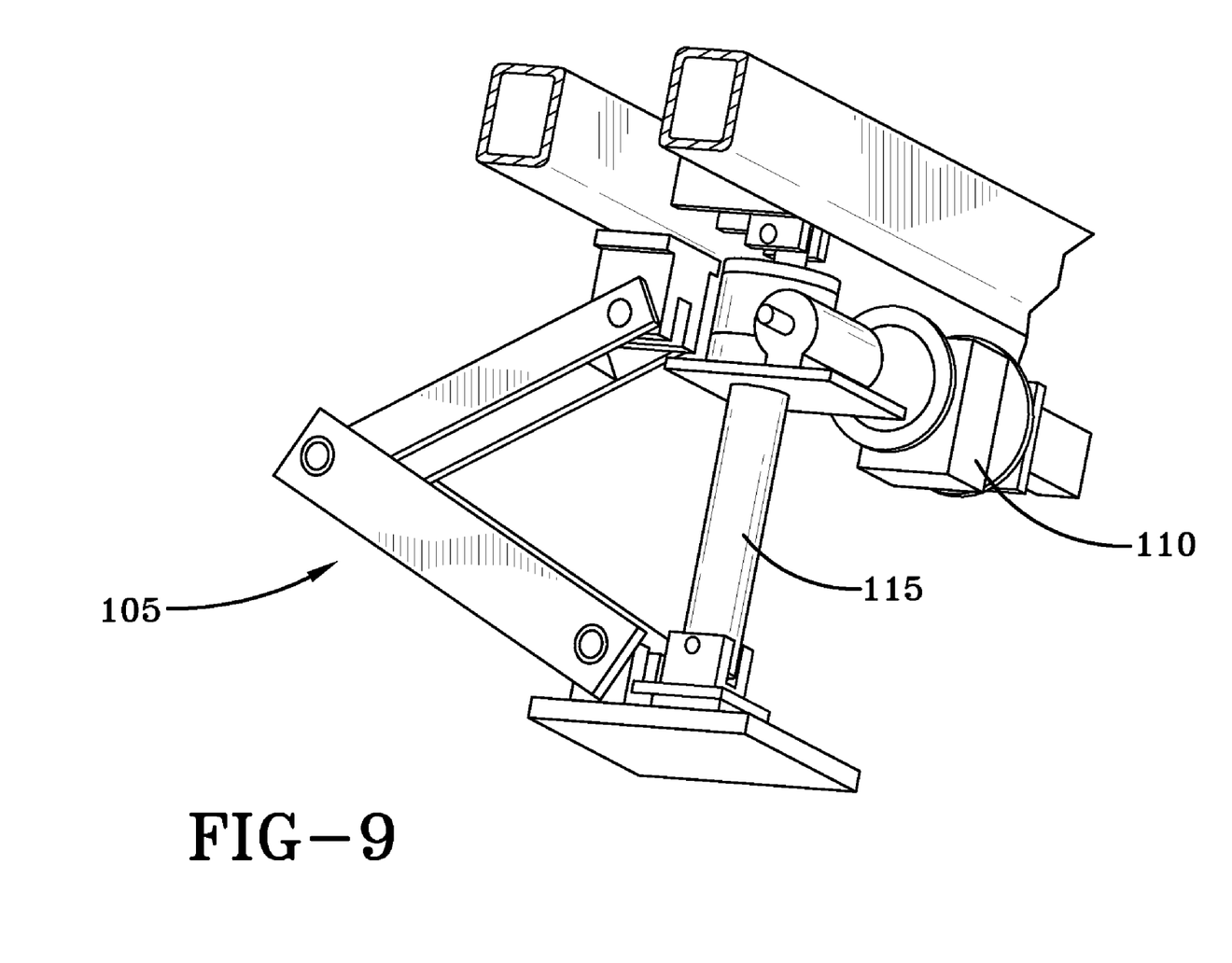
FIG. 9 is an enlarged view of a frame lift assembly that produces simultaneous vertical movement of one end of the individual conveyor units of FIG. 1.

A conveyor of the present invention may also be provided with the ability to simultaneously and uniformly adjust the height of at least one end of all its associated conveyor units. For example, the exemplary conveyor 5 shown and described herein is provided with a frame lift assembly 105 at one end thereof for this purpose. The frame lift assembly 105 of this embodiment includes a servo motor 110 and an associated jack screw 115. The frame lift assembly 105 may extend between the conveyor frame 10a and the conveyor sub-frame 10b or the ground and the conveyor sub-frame such that when the servo motor 110 is activated, one end of all the conveying units 15a-15f is selectively and uniformly raised or lowered. Alternatively, the frame lift assembly 105 may extend between the ground and the conveyor frame 10a for the same purpose. An exemplary angle between the frame 10a and sub-frame 10b produced by such an adjustment can be observed in FIG. 6.

As should be apparent to one of skill in the art, the various conveyor configurations shown in FIGS. 3-6 are provided for purposes of non-limiting illustration only. Since the position of each conveying unit 15a-15f is independently adjustable in both a lateral and vertical direction, a multitude of different overall conveyor configurations are possible, and these configurations are in no way limited to the examples provided herein.

Therefore, while certain embodiments of the present invention are described in detail above, the scope of the invention is not to be considered limited by such disclosure, and modifications are possible without departing from the spirit of the invention as evidenced by the following claims:

What is claimed is:

1. An adjustable multi-lane conveyor, comprising:
   a conveyor frame;
   a plurality of individual conveying units, each conveying unit including a conveying unit frame, a conveyor belt, and a drive means for driving said conveyor belt, said conveying units movably coupled to said conveyor frame;
   a lateral positioning assembly associated with said conveying units, said lateral positioning assembly operative to laterally displace an associated conveying unit with respect to a centerline of said conveyor frame; and
   a vertical positioning assembly associated with each conveying unit, said vertical positioning assembly operative to vertically displace an associated conveying unit with respect to the ground;
   wherein, the lateral and vertical position of each conveying unit is independently adjustable to allow for the formation of different conveyor configurations.

2. The conveyor of claim 1, further comprising a conveyor sub-frame residing between said conveyor frame and said conveying unit frames, said conveying units movably coupled to said conveyor sub-frame.

3. The conveyor of claim 1, wherein each lateral positioning assembly is slidably associated with said conveyor sub-frame.

4. The conveyor of claim 3, wherein said lateral positioning assembly includes a motor, a threaded drive shaft coupled to said motor and passing through a clutch/brake device of each conveying unit, said clutch/brake devices operative to selectively couple and decouple associated conveying units to/from said drive shaft.

5. The conveyor of claim 1, wherein each vertical positioning assembly is disposed between said conveyor sub-frame and the frame of an associated conveying unit.

6. The conveyor of claim 1, wherein each vertical positioning assembly includes a motor coupled to a central lift mechanism by a ball screw, and a pair of outwardly disposed lift mechanisms located near opposite ends of each conveying unit, said outwardly disposed lift mechanisms coupled to said central lift mechanism by associated linkage rods such that said linkage mechanisms are uniformly raised or lowered by operation of said motor.

7. The conveyor of claim 1, further comprising a frame lift assembly for simultaneously and uniformly raising or lowering one end of all of said conveying units.

8. The conveyor of claim 7, wherein each frame lift assembly is disposed between said conveyor frame and said conveyor sub-frame.

9. The conveyor of claim 8, wherein each frame lift assembly includes a motor and an associated jack screw that is extended or retracted by operation of said motor.

10. The conveyor of claim 1, wherein all of said conveying units are used to convey an object of interest.

11. The conveyor of claim 1, wherein only certain ones of said conveying units are used to convey an object of interest.

12. An adjustable multi-lane conveyor, comprising:
a conveyor frame;
a plurality of individual conveying units, each conveying unit including a conveying unit frame, a conveyor belt, and a drive means for driving said conveyor belt;
a conveyor sub-frame residing between said conveyor frame and said conveying unit frames, said conveying units movably associated with said conveyor sub-frame;
a lateral positioning assembly associated with said conveying units, said lateral positioning assembly including a motor coupled to a drive shaft that passes through each conveying unit, said lateral positioning assembly operative to laterally displace an associated conveying unit with respect to a centerline of said conveyor frame; and
a vertical positioning assembly associated with each conveying unit, each vertical positioning assembly disposed between said conveyor sub-frame and the frame of an associated conveying unit and operative to vertically displace an associated conveying unit with respect to the ground;
wherein, the lateral and vertical position of each conveying unit is independently adjustable to allow for the formation of different conveyor configurations.

13. The conveyor of claim 12, wherein said lateral positioning assembly includes a motor, a threaded drive shaft coupled to said motor and passing through a clutch/brake device of each conveying unit, said clutch/brake devices operative to selectively couple and decouple associated conveying units to/from said drive shaft.

14. The conveyor of claim 12, wherein each vertical positioning assembly is disposed between said conveyor sub-frame and the frame of an associated conveying unit.

15. The conveyor of claim 12, wherein each vertical positioning assembly includes a motor coupled to a central lift mechanism by a ball screw, and a pair of outwardly disposed lift mechanisms located near opposite ends of each conveying unit, said outwardly disposed lift mechanisms coupled to said central lift mechanism by associated linkage rods such that said linkage mechanisms are uniformly raised or lowered by operation of said motor.

16. The conveyor of claim 12, further comprising a frame lift assembly for simultaneously and uniformly raising or lowering one end of all of said conveying units.

17. The conveyor of claim 16, wherein each frame lift assembly includes a motor and an associated jack screw that is extended or retracted by operation of said motor.

18. An adjustable multi-lane conveyor, comprising:
a conveyor frame;
a plurality of individual conveying units, each conveying unit including a conveying unit frame, a conveyor belt, and a drive means for driving said conveyor belt;
a conveyor sub-frame residing between said conveyor frame and said conveying unit frames, said conveying units slidably associated with said conveyor sub-frame;
a lateral positioning assembly associated with said conveying units, said lateral positioning assembly including a motor, a threaded drive shaft coupled to said motor and passing through a clutch/brake device of each conveying unit, said clutch/brake devices operative to selectively couple and decouple associated conveying units to/from said drive shaft, said lateral positioning assembly operative to laterally displace a selected conveying unit with respect to a centerline of said conveyor frame; and
a vertical positioning assembly associated with each conveying unit, each vertical positioning assembly disposed between said conveyor sub-frame and the frame of an associated conveying unit and including a motor coupled to a central lift mechanism by a ball screw and a pair of outwardly disposed lift mechanisms located near opposite ends of each conveying unit, said outwardly disposed lift mechanisms coupled to said central lift mechanism by associated linkage rods such that said linkage mechanisms are uniformly raised or lowered by operation of said motor, said vertical positioning assembly operative to vertically displace an associated conveying unit with respect to the ground;
wherein, the lateral and vertical position of each conveying unit is independently adjustable to allow for the formation of different conveyor configurations.

19. The conveyor of claim 18, further comprising a frame lift assembly for simultaneously and uniformly raising or lowering one end of all of said conveying units.

20. The conveyor of claim 19, wherein each frame lift assembly includes a motor and an associated jack screw that is extended or retracted by operation of said motor.

* * * * *